Oct. 22, 1957 C. F. BALL 2,810,304
APPARATUS FOR CONTROLLING THE TRANSMISSION OF TORQUE
Original Filed Oct. 19, 1950 2 Sheets-Sheet 1

Inventor:
Charles F. Ball.
by
[signature]
Attorney.

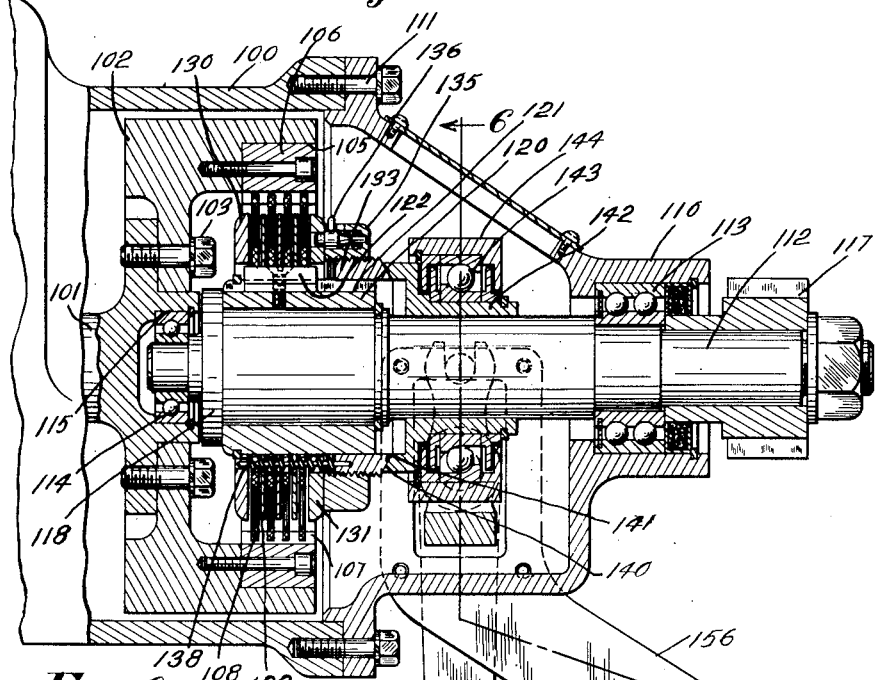

United States Patent Office 2,810,304
Patented Oct. 22, 1957

2,810,304

APPARATUS FOR CONTROLLING THE TRANSMISSION OF TORQUE

Charles F. Ball, Franklin, Pa., assignor to Joy Manufacturing Company, Pittsburgh, Pa., a corporation of Pennsylvania Application September 18, 1952, Serial No. 310,338

16 Claims. (Cl. 74—789)

This invention relates to apparatus for controlling the transmission of torque.

Various devices exist for the transmission of predetermined torques. Among them are devices which include planetary trains having reaction elements—gears or gear mountings—which are adapted to be held stationary with predetermined degrees of tightness and which are adapted to slip, and to rotate and so interrupt drive, when the torque being transmitted exceeds a desired and predetermined amount. Again friction clutches having means for loading them predeterminedly are effective for the same purpose. Other arrangements will suggest themselves to those skilled in the art.

The present invention is an improved apparatus for effecting application of a predetermined pressure to a friction device, such as a friction clutch, a friction band controlling a reaction element, or the like and precluding the exceeding of such pressure regardless of the force which may be available for effecting actuation; and, in a preferred embodiment, it may include an expansible chamber device the expanson of whose chamber effects the application of the designed pressure, means for supporting said expansible chamber device including an abutment relative to which the reaction to the force exerted tends to cause said expansible chamber device to move, means for yieldingly holding said expansible chamber device stationary relative to said abutment, but yieldable before the maximum volume of said chamber is attained, said last mentioned means desirably having associated with it means for adjusting its yield point, and means being provided for the supply of a fluid under pressure to cause expansion of said expansible chamber device and for venting such fluid.

An object of the invention is to provide an improved control for the torque transmitted by a device adapted to transmit a predetermined torque and to slip when such predetermined torque is exceeded. Another and more specific object is to provide an improved loading means for a friction clutch. Still another more specific object is to provide an improved holding means for a reaction element forming a part of a planetary drive. Yet a further object is to provide a hydraulic force-applying means having means for adjustably limiting the force it is adapted to apply regardless of the maximum hydraulic pressure available. Still another object of the invention is to provide a quick-acting hydraulic loading means which, provided the hydraulic operating pressure is sufficient, will produce like maximum loading notwithstanding wide variations in the excess of the hydraulic pressure over the minimum required. Other objects and advantages of the invention will hereinafter more fully appear.

In the accompanying drawings, in which there are shown for purposes of illustration two illustrative applications of the invention:

Figure 5 is a central longitudinal section through a friction clutch having associated with it a control according to another embodiment of the invention, the scale being much larger than that of Figures 1 and 2.

Figure 6 is a transverse section on the plane of the lines 6—6 of Figure 5.

Figure 1:
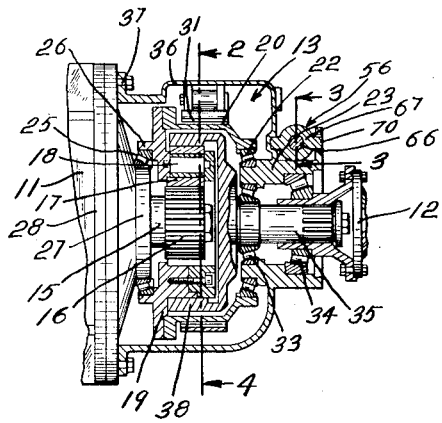
Figure 1 is a central longitudinal section through a planetary transmission in which there is incorporated an element whose release interrupts power transmission and which is adapted to be held, by an illustrative embodiment of the invention, until the torque transmitted attains to a maximum desired value.
Figure 2:
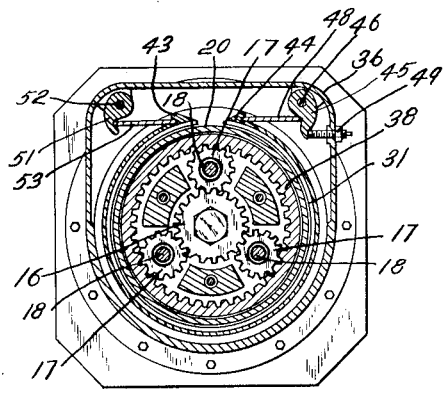
Figure 2 is a transverse section on the plane of the line 2—2 of Figure 1.
Figure 3:
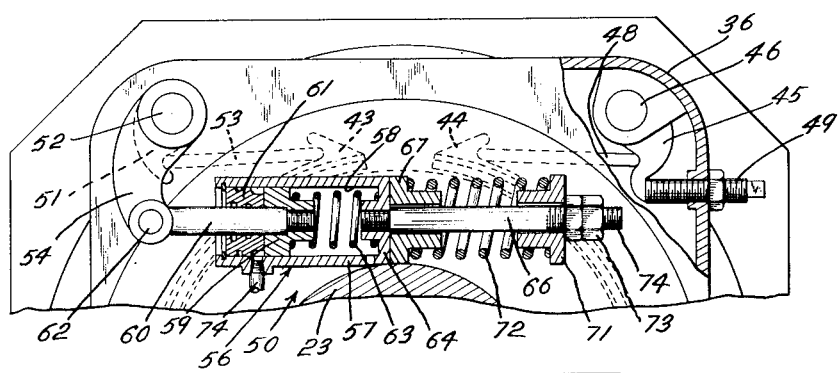
Figure 3 is a much enlarged transverse section on the plane of the line 3—3 of Figure 1.

Referring first to the embodiment illustrated in Figures 1 to 3, it will be noted that a motor 11 is adapted to transmit power to a driven element 12 through a transmission generally designated 13. The motor armature shaft 15 carries a driving pinion 16 which meshes with a plurality of planet gears 17. The planet gears 17 are journaled on pins 18 which are supported at their opposite ends in a two-part support structure 19. The support structure 19 has upon its periphery a cylindrical brake surface 20. The support structure 19 is supported at one end for rotation by a combined radial and thrust bearing 22 disposed between it and a sleeve portion 23 later described. The support structure 19 is further supported at its other end by another combined radial and thrust bearing 25 arranged between a circular flange 26 formed on the support structure 19 and a cylindrical surface 27 formed on the adjacent motor head 28. With the cylindrical braking surface 20 a brake band 31 is adapted to have frictional engagement. The driven element 12 is supported in the sleeve portion 23 by a combined radial and thrust bearing 33 and another combined radial and thrust bearing 34 surrounds a shaft 35 on which the driven element 12 is mounted. The shaft 35 supports an internal gear 38 with which the planet elements 17 severally mesh. The sleeve portion 23 is carried by a housing 36 fastened as at 37 to the motor head 28. It will be evident that if the support structure 19 is held stationary, there will be transmitted to the driven element 12 a drive at a predetermined reduced speed; that if support structure 19 be allowed to rotate freely there will be no power transmitted to the driven element 12, and that if the support structure be allowed to rotate at a relatively slow speed, a further reduced speed of drive will be transmitted to the driven element 12. It will of course be understood that the element 12 is a driven element as regards drive by the motor, but is a driving element for any mechanism to which it transmits power.

To control the brake band 31 and so the selective rotation and holding stationary of the support structure 19, the following arrangement is provided herein. The brake band 31 has at its opposite ends recessed end portions 43 and 44. An adjusting mechanism is associated with one of these recessed end portions, herein 44, this including a swingable lever arm 45, pivotally supported at 46 in the housing 36 and having engagement with one end of a strut element 48 whose other end engages the recessed member 44. A lock nut equipped adjusting screw 49 is adapted to cooperate with the lever 45, and inward adjustment of this screw effects a take-up or tightening adjustment of the brake band.

Hydraulic brake-applying means is provided in association with the brake band 31, this being generally designated 50. It includes, as illustrated, a lever 51 supported on a shaft 52, pivoted in the casing 36, and a strut 53 extends between the recessed end member 43 and the lever 51. To effect swing of the lever 51 in a brake-applying direction, the shaft 52 carries another arm 54 outside of the casing, and a hydraulic cylinder and piston device 56 is provided to swing the lever 54. The device 56 includes a cylinder 57 having a bore 58 in which a piston 59 is mounted for relative reciprocation between it and the cylinder. The piston 59 has connected to it a piston rod 60 which extends through a suitably packed cylinder head 61 and is pivotally connected at 62 to the lower end of the lever 54. A spring 63 is enclosed within the cylinder bore 58 and acts between the piston 59 and a cylinder head 64 opposite the cylinder head 61 and herein shown as formed integral with the cylinder 57. The spring 63 normally maintains the piston 59 in the position to release the brake band 31. A rod 66 is secured to the cylinder head 64 and extends through an abutment member 67 which is supported by trunnions 70 against movement in a direction longitudinal of the cylinder 57 but permitted to oscillate upon a transverse axis—the axis of the trunnions. As will be seen from Figures 1 and 3, the device 56 is outside of the casing 36 but supported on the latter. Between the abutment 67 and an adjustable follower 71 mounted on the rod 66 a much heavier spring 72 (much stronger that the spring 63) is confined. Nuts 73 on the threaded end 74 of the rod 66 control the position of the follower 71 and permit adjustment of the tension of the spring 72. It will be seen that admission of fluid to act on the piston 59, which can be accomplished through a fluid supply conduit 74, will, if the fluid be under sufficient pressure, cause movement of the piston 59 toward the right in the cylinder bore 58. This will swing the lever 54 counterclockwise and effect application of the brake band 31.

The spring 63 is provided for the purpose of moving the piston 59 back towards the cylinder head 61 and thus releasing the brake band 31, when pressure fluid is released from the space between the cylinder head 61 and the piston 59. The spring 72 will be pre-loaded to a desired degree. When pressure fluid is applied to conduit 74, the separative force provided between the piston 59 and the cylinder head 61 will tend to push that cylinder head, and the cylinder with it, to the left, and to push the piston 59 to the right. If the cylinder were freely movable to the left, it would so move and the piston 59 would not move to the right and effect tightening of the brake band. The cylinder 57 is, however, incapable of moving out of contact with the trunnion supported abutment 67 unless the spring 72 is further compressed and that spring, as above noted, is a pre-loaded one. Accordingly, until the force acting on the piston 59 becomes greater than the force exerted by the spring 72 which holds the cylinder 57 against the abutment 67, the piston 59 will move to the right, while the cylinder 57 remains stationary, and the brake band 31 will be applied with a progressively increasing tightness. When the brake-applying force gets high enough, the pre-loading of the spring 72 will be exceeded by the force exerted by the head 61 of the cylinder 57 on the rod 66, and the spring 72 will yield, and the cylinder 57 will commence to move away from the abutment 67. When the force acting between the piston 59 and the head 61 gets great enough so that the mutually opposite movements of the piston 59 and of the cylinder 57 result in contact between the piston and the right-hand head 64 of the cylinder, no further increases in brake-applying force will be possible by increase of pressure between the piston 59 and head 61. Evidently, when the brake-applying force reaches a predetermined value the pre-loaded spring 72 will yield, and when the brake-applying force gets to some absolute value which is the maximum desired and which is determined by the range of movement between the piston 59 and the cylinder 57 and the rate and pre-loading of the spring 72, there will be a definite maximum limit to the brake-applying force.

Figure 4:
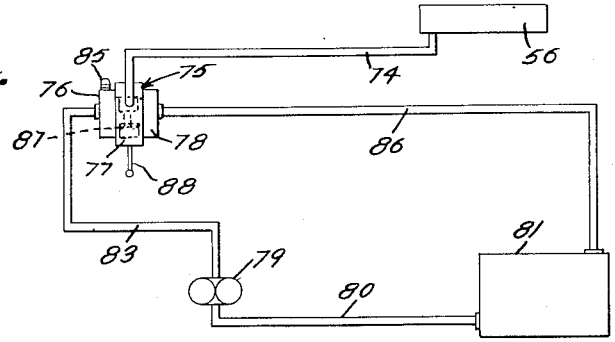
Figure 4 is a diagrammatic view showing a hydraulic control system.

In Figure 4 there is shown a hydraulic diagram which illustrates in an elementary form a suitable system for the control of the cylinder and piston mechanism 56, both as hereinabove described and as arranged in the other embodiment which will shortly be described herein. It will be noted that the cylinder and piston mechanism 56 is shown, and that conduit 74 leads to the cylinder and piston mechanism 56 from a valve box arrangement generally designated 75. The valve box arrangement 75 includes a supply box 76, a control box 77 and a return box 78. Fluid is adapted to be taken by a pump 79 through a suction line 80 from a reservoir 81 for a hydraulic fluid. The pump 79 discharges to a discharge line 83 which leads to the supply box 76, and a relief valve 85 is associated with the supply box 76. On opening of this relief valve, when the pump discharge pressure gets too high, fluid is permitted to by-pass in a well-known manner from the supply box 76 through the control valve box 77 to the discharge box 78, and to pass from the latter to an exhaust conduit 86 leading back to the reservoir 81. The valve box 77 contains a valve 87 conventionally represented in dotted lines and having an operating handle 88. When the valve 87 controlled by the handle 88 is in normal position—the one which it occupies when the handle is released by the operator, fluid flows freely from the discharge conduit 83 through the three boxes 76, 77 and 78 and through the conduit 86 back to the reservoir 81, and the pump 79 is freed from substantial back pressure. When the handle 88 is moved to effect supply of fluid under pressure to the conduits 74, it interrupts free communication between the pump discharge conduit 83 and the return conduit 86 and directs fluid under pressure to the conduit 74. Opposite movement of the handle 88 interrupts connection between the supply conduit 83 and the conduit 74 and connects the latter back to the return conduit 86. When the handle 88 is freed from operator control, the conduit 74 is closed at its end remote from the cylinder and piston mechanism 56 and fluid is trapped in the latter.

In Figures 5 and 6 there is shown another illustrative embodiment of the invention, this time incorporated in association with a friction disc clutch. In this figure a portion of a casing, which might be a crankcase, is shown at 100. Within the casing there rotates a shaft 101 which has, as illustrated, a flywheel 102 fixed to it by screws 103. The flywheel 102 has secured within a recess 105 an annular member 106 which is provided with axially inwardly projecting drivers 107 which interlockingly engage with clutch discs 108. The casing 100 has another casing 110 secured to it as by machine screws 111. A driving shaft 112 is supported near one end in radial and thrust bearings 113 which are housed in the casing 110. The other, and herein reduced, end of the shaft 112 is supported by radial and thrust bearings 114 in a chamber 115 formed in the end of the crank shaft 101. The shaft 112 carries a drive pinion 117 at its end which projects from the casing 110 and near its other end, and adjacent a radial flange 118 thereon, it carries a sleeve 120 which has grooves 121 therein for the reception of keys 122 which interlockingly engage with intermediate clutch discs 123, the clutch discs 123 each lying between a pair of the clutch discs 108 previously mentioned. An abutment plate 130 surrounds the sleeve 120 and is adapted to have the clutch discs pressed towards it. A pressure plate 131 is arranged at the other end of the clutch discs from the abutment plate 130, and both the pressure plate and the abutment plate rotate with the sleeve 120, which in turn is connected in any suitable manner in driving relation to the shaft 112. Adjustment of the pressure plate is effected by a sleeve 133 slidably mounted on the sleeve 120 and having threadedly mounted upon its exterior and adjusting ring 135 which, when suitably adjusted, is adapted to be locked in a well-known manner by conventional locking pin means 136 with the pressure plate 131. Spring means 138, of conventional construction, is provided for moving the pressure plate 131 away from the abutment plate 130 when the clutch loading means permits this to be done. All the structure so far described is essentially conventional.

The ring 135 has a face 140 with which a surface 141 on a clutch loading sleeve 142 engages. The clutch loading sleeve is freely rotatable on the shaft 112 and is surrounded by a ball thrust bearing arrangement 143 which is housed in a ring 144 provided with trunnions 145. The trunnions 145 are received in slots 146 in spaced arms 147 on a rocker element 148 which is supported on and locked by a shaft 149 journaled in bearings 150 carried in cover plates 151 and 152, which are in turn carried by the casing 110. This structure also is essentially conventional as is likewise the clutch operating arm 155 which is clamped, as shown, to the shaft 149.

The cover plate 152 has extending therefrom an arm portion 156 with which a yoke-like element 157 cooperates to provide mountings 158 and 159 for the trunnions 70' of a cylinder and piston mechanism 56' corresponding in all essential particulars with the mechanism 56 of the first embodiment. Reference characters with primes are applied in Figure 5 to the various parts of the mechanism 56'. The particular function of the priming of the reference characters is to indicate that relative strengths of springs and proportions of parts are varied if this proves desirable. This modification's operation is the same in substance as that of the first embodiment. The admission of fluid to the conduit 74 initially causes the piston 59' to move to the right. This causes the arms 147 to move the clutch applying sleeve 142 to load the friction clutch. When the piston 59' engages the cylinder head 64', no increased force of application of the clutch will be possible. Before contact of the piston 59' with the head 64' takes place, the spring 72' will commence to yield to provide a limit to the clutch pressure which cannot be much exceeded, if the length and rate of the spring 72' is properly determined, before an absolute limit will be attained due to engagement of the piston 59' with the head 64'.

It will be evident that my improved torque limiting control mechanism may be applied in other mechanisms and that wherever applicable it will accomplish the desirable functions above mentioned as among its objects. It is obviously readily adjustable, simple and free from complex parts.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim is:

1. In a friction band applying apparatus, in combination, a member having a peripheral surface to be contacted by a friction band, a split friction band surrounding said surface, means for holding one end of said band against retrogressive movement, and means for forcing the other end of said band towards the end so held to effect band application including a cylinder having a bore and opposite heads, a piston reciprocable in said bore and having a piston rod extending through one head of said cylinder, connections between said piston rod and said other end of said band for effecting band application upon separative movement between said piston and the head traversed by its rod, means for supplying fluid between said piston and such head, means for supporting said cylinder including an abutment engaged by the other head of said cylinder, means for supporting said cylinder for movement away from and back towards said abutment, and means for yieldingly holding said cylinder against said abutment.

2. In a friction band applying apparatus, in combination, a member having a peripheral surface to be contacted by a friction band, a split friction band surrounding said surface, means for holding one end of said band against retrogressive movement, and means for forcing the other end of said band towards the end so held to effect band application including a cylinder having a bore and opposite heads, a piston reciprocable in said bore and having a piston rod extending through one head of said cylinder, connections between said piston rod and said other end of said band for effecting band application upon separative movement between said piston and the head traversed by its rod, means for supplying fluid between said piston and such head, means for supporting said cylinder including an abutment engaged by the other head of said cylinder, means for supporting said cylinder for movement away from and back towards said abutment, and means for yieldingly holding said cylinder against said abutment set to yield before said piston contacts said other head of the cylinder.

3. In a friction band applying apparatus, in combination, a member having a peripheral surface to be contacted by a friction band, a split friction band surrounding said surface, means for holding one end of said band against retrogessive movement, and means for forcing the other end of said band towards the end so held to effect band application including a cylinder having a bore and opposite heads, a piston reciprocable in said bore and having a piston rod extending through one head of said cylinder, connections between said piston rod and said other end of said band for effecting band application upon separative movement between said piston and the head traversed by its rod, means for supplying fluid between said piston and such head, a spring acting between the piston and the other head of the cylinder to move the piston to effect band slackening, means for supporting said cylinder including an abutment engaged by the other head of said cylinder, means for supporting said cylinder for movement away from and back towards said abutment, and means for yieldingly holding said cylinder against said abutment.

4. In a friction band applying apparatus, in combination, a member having a peripheral surface to be contacted by a friction band, a split friction band surrounding said surface, means for holding one end of said band against retrogressive movement, and means for forcing the other end of said band towards the end so held to effect band application including a cylinder having a bore and opposite heads, a piston reciprocable in said bore and having a piston rod extending through one head of said cylinder, connections between said piston rod and said other end of said band for effecting band application upon separative movement between said piston and the head traversed by its rod, means for supplying fluid between said piston and such head, a spring acting between the piston and the other head of the cylinder to move the piston to effect band slackening, means for supporting said cylinder including an abutment engaged by the other head of said cylinder, means for supporting said cylinder for movement away from and back towards said abutment, and means for yieldingly holding said cylinder against said abutment including a spring stronger than said first spring.

5. In a friction band applying and releasing apparatus, in combination, a member having a peripheral surface to be contacted by a friction band, a split friction band surrounding said surface, means for holding one end of said band against retrogressive movement, and means for forcing the other end of said band towards the end so held to effect band application including an expansible chamber motor having incorporated therein means providing a limit for the stroke thereof, means for supplying fluid to said motor to cause it to effect its stroke, connections between said motor and said other end of said band for effecting progressive band application as said motor makes its stroke, means for supporting said motor including an abutment relative to which it tends to move when making its stroke, and means for normally overcoming such tendency yieldable upon the existence of a predetermined pressure within said motor exceeding that which corresponds to the desired band application.

6. In a friction band applying and releasing apparatus, in combination, a member having a peripheral surface to be contacted by a friction band, a split friction band surrounding said surface, means for holding one end of said band against retrogressive movement, and means for forcing the other end of said band towards the end so held to effect band application including an expansible chamber motor having incorporated therein means providing a limit for the stroke thereof, means for supplying fluid to said motor to cause it to effect its stroke, connections between said motor and said other end of said band for effecting progressive band application as said motor makes its stroke, means for supporting said motor including an abutment relative to which it tends to move when making its stroke, and means for normally overcoming such tendency yieldable upon the existence of a predetermined pressure within said motor exceeding that which corresponds to the desired band application, said motor having its means for limiting its stroke set to operate at a point when the pressure therein only moderately exceeds the normal force exerted by said last mentioned means.

7. In an apparatus for exerting a predetermined force and adjustable to vary the value of said predetermined force, an expansible chamber device expansion of whose chamber effects force application, said device having a predetermined maximum volume, means for supplying fluid to said device to cause expansion of its chamber, means for supporting said device including an abutment from which the reaction to the force exerted tends to cause said expansible chamber device to move away, and means for yieldingly holding said device stationary relative to said abutment responsive to the pressure within said chamber and yieldable before the maximum volume of said chamber is reached, said last mentioned means having means for adjusting its yield point.

8. The combination with the structure recited in claim 7, of a friction clutch arranged for loading by said structure.

9. The combination with the structure recited in claim 7, of a planetary gearing having a reaction element provided with a friction band for holding it stationary and arranged for tensioning by such structure.

10. In combination, a pair of relatively rotatable members frictionally engageable with each other and operative when slippage between them is precluded to effect the transmission of a torque, and means for effecting an engagement between said members precluding relative slippage between them including an element movable to effect an engagement precluding slippage and actuating and controlling means for said member including a cylinder having a bore and having spaced heads in stationary relation thereto, a piston reciprocable in said bore and having a piston rod extending through one head of said cylinder, connections between said piston rod and said element for applying a force to the latter to prevent relative slippage upon separative movement between the piston and the head traversed by its rod, means for supplying and venting fluid between said piston and such head, means for supporting said cylinder including an abutment engaged by the other head of said cylinder, means for supporting said cylinder and the latter head for movement away from and back towards said abutment, and means for yieldingly holding said cylinder against said abutment.

11. The combination recited in claim 10 in which said relatively rotatable members are friction clutch discs.

12. The combination recited in claim 10 in which said members are a planet-supporting reaction member and a friction band for holding the latter against rotation.

13. In an apparatus for transmitting a predetermined torque and slipping if such torque is exceeded, in combination, a member, a relatively movable member, said members having surfaces coacting, when said surfaces are pressed into close enough engagement, to preclude relative movement and effect torque transmission, and means for effecting engagement between said surfaces precluding relative movement between them comprising an expansible chamber motor having a limited stroke, means for supplying fluid to said motor to cause it to effect its stroke, connections between said motor and at least one of said members for effecting increasing tightness of engagement between said members as said motor makes its stroke, means for supporting said motor including an abutment normally engaged thereby and relative to which it tends to have separative movement under the force produced when it is making its stroke, and means for normally overcoming such tendency, yieldable upon the attainment of a predetermined pressure within said motor.

14. In an apparatus for transmitting a predetermined torque and slipping if such torque is exceeded in combination, a member, a relatively movable member, said members each being a friction clutch member and having surfaces coacting when said surfaces are pressed into close enough engagement, to preclude relative movement and to effect torque transmission, and means for effecting engagement between said surfaces precluding relative movement between them comprising an expansible chamber motor having a limited stroke, means for supplying fluid to said motor to cause it to effect its stroke, connections between said motor and at least one of said members for effecting increasing tightness of engagement between said members as said motor makes its stroke, means for supporting said motor including an abutment relative to which it tends to have movement of separation under the force produced when it is making its stroke, and means for normally overcoming such tendency yieldable upon the existence of a predetermined pressure within said motor.

15. In an apparatus for transmitting a predetermined torque and slipping as such torque is exceeded in combination, a member, a relatively movable member, said members having surfaces coacting when said surfaces are pressed into close enough engagement, to preclude relative movement and effect torque transmission, said first member a relatively stationary brake band and said relatively movable member being a reaction member carrying a portion of a planetary gearing with which other portions are associated to form a torque converter, and means for effecting engagement between said surfaces precluding relative movement between them comprising an expansible chamber motor having a limited stroke, means for supplying fluid to said motor to cause it to effect its stroke, connections between said motor and at least one of said members for effecting increasing tightness of engagement between said members as said motor makes its stroke, means for supporting said motor including an abutment relative to which it tends to have separative movement when making its stroke and means for normally overcoming such tendency yieldable on the attainment of a predetermined pressure within said motor.

16. In an apparatus for transmitting a torque, in combination, a pair of members relative slippage between which interrupts torque transmission, and between which the prevention of slippage effects torque transmission, and means for selectively preventing and permitting such slippage and for automatically preventing such slippage upon the attainment of the torque to a predetermined value, including a motor comprising a cylinder element having a bore and mutually spaced heads fixed with respect to movement relative to said cylinder element, a piston reciprocable in said bore and having a piston rod element extending through one head of said cylinder element, connections between one of said elements and one of said pair of members for effecting movement of the latter to preclude slippage upon separative movement between said piston and the head traversed by said piston rod element, means for supporting said motor including an abutment engageable by the other of said elements, means for supporting said last mentioned element for movement away from and back towards said abutment as the pressure within said motor respectively increases and decreases with respect to a predetermined value, and means for yieldingly biasing said last mentionel element towards said abutment.

References Cited in the file of this patent

UNITED STATES PATENTS

| | | |
|---|---|---|
| 206,734 | Jacker | Aug. 6, 1878 |
| 1,828,860 | Conklin | Oct. 27, 1931 |
| 2,174,018 | Schaum | Sept. 26, 1939 |
| 2,275,142 | Hale | Mar. 3, 1942 |
| 2,341,587 | Andres et al. | Feb. 15, 1944 |
| 2,513,192 | McFarland | June 27, 1950 |